(12) United States Patent
Seedorf et al.

(10) Patent No.: US 10,530,884 B2
(45) Date of Patent: Jan. 7, 2020

(54) METHOD AND DEVICE OF PROCESSING ICN INTEREST MESSAGES IN A DTN SCENARIO

(71) Applicant: NEC Europe Ltd., Heidelberg (DE)

(72) Inventors: Jan Seedorf, Heidelberg (DE); Dirk Kutscher, Heidelberg (DE); Bilal Gill, Otaniemi (FI)

(73) Assignee: NEC CORPORATION, Tokyo (JP)

( * ) Notice: Subject to any disclaimer, the term of this patent is extended or adjusted under 35 U.S.C. 154(b) by 215 days.

(21) Appl. No.: 15/560,166

(22) PCT Filed: Mar. 25, 2015

(86) PCT No.: PCT/EP2015/056443
§ 371 (c)(1),
(2) Date: Sep. 21, 2017

(87) PCT Pub. No.: WO2016/150502
PCT Pub. Date: Sep. 29, 2016

(65) Prior Publication Data
US 2018/0091615 A1 Mar. 29, 2018

(51) Int. Cl.
*G06F 15/173* (2006.01)
*H04L 29/08* (2006.01)
*H04L 9/32* (2006.01)

(52) U.S. Cl.
CPC ........ *H04L 67/2842* (2013.01); *H04L 9/3247* (2013.01); *H04L 67/10* (2013.01); *H04L 2463/081* (2013.01)

(58) Field of Classification Search
None
See application file for complete search history.

(56) References Cited

U.S. PATENT DOCUMENTS

| | | | |
|---|---|---|---|
| 2009/0129316 A1* | 5/2009 | Ramanathan | H04L 45/123 370/328 |
| 2010/0318786 A1* | 12/2010 | Douceur | H04L 9/3247 713/155 |
| 2013/0339481 A1 | 12/2013 | Hong et al. | |
| 2014/0192717 A1* | 7/2014 | Liu | H04W 60/00 370/328 |
| 2015/0188899 A1* | 7/2015 | Bakar | H04L 67/125 726/9 |
| 2016/0173386 A1* | 6/2016 | Garcia-Luna-Aceves | H04L 47/17 709/238 |
| 2016/0212066 A1* | 7/2016 | Ravindran | H04L 47/80 |

(Continued)

*Primary Examiner* — Dhairya A Patel
(74) *Attorney, Agent, or Firm* — Leydig, Voit & Mayer, Ltd.

(57) ABSTRACT

A method of processing information centric networking (ICN) interest messages in a delay tolerant networking (DTN) scenario, wherein ICN data mules receive interests for content from end-users and disseminate content to end-users based on the interests and/or during encounters with other ICN data mules, includes performing a popularity estimation of content; appending, by a first end-user when forwarding an interest for given content to a data mule, a nonce to the interest; and employing, by a first data mule, the appended nonce according to predefined rules to maintain and/or record a counter for interests for the given content. The counter functions as a popularity indicator for the given content.

16 Claims, 6 Drawing Sheets

(56) References Cited

U.S. PATENT DOCUMENTS

| | | | |
|---|---|---|---|
| 2017/0359260 A1* | 12/2017 | Wood | H04L 45/7453 |
| 2017/0373975 A1* | 12/2017 | Moiseenko | H04L 45/748 |
| 2018/0006937 A1* | 1/2018 | Liu | H04L 45/74 |
| 2018/0091615 A1* | 3/2018 | Seedorf | H04L 67/10 |
| 2018/0146058 A1* | 5/2018 | Somayazulu | H04L 43/16 |

* cited by examiner

METHOD AND DEVICE OF PROCESSING ICN INTEREST MESSAGES IN A DTN SCENARIO

CROSS REFERENCE TO RELATED APPLICATIONS

This application is a U.S. National Stage Application under 35 U.S.C. § 371 of International application Ser. No. PCT/EP2015/056443 filed on Mar. 25, 2015. The International Application was published in English on Sep. 29, 2016 as WO 2016/150502 A1 under PCT Article 21(2).

STATEMENT REGARDING FUNDING

The work leading to this invention has received funding from the European Union's Seventh Framework Programme (FP7/2007-2013) under grant agreement n° 608518.

FIELD

The present invention relates to a method of processing information centric networking (ICN) interest messages in a delay tolerant networking (DTN) scenario, wherein ICN data mules receive interests for content from end-users and disseminate content to end-users based on said interests and/or during encounters with other ICN data mules. Furthermore, the present invention relates to a device for deployment in a DTN scenario, comprising communication means for receiving interests for content from end-users and for disseminating content to end-users based on said interests and/or during encounters with other communication devices that function as ICN data mules within said DTN scenario.

BACKGROUND

Recently, it has been suggested (and many researchers are investigating) to use Information Centric Networking (ICN) approaches and concepts as a baseline technology for enabling communication in Delay Tolerant Networking (DTN) type scenarios, in particular disaster scenarios (cf. J. Seedorf et al.: "Using ICN in disaster scenarios; draft-seedorf-icn-disaster-02", ICNRG Internet-Draft, Jun. 27, 2014, http://tools.ietf.org/html/draft-seedorf-icn-disaster-02). In such a scenario, so-called ICN data mules (that carry and disseminate data times) may move randomly, and each time data mules encounter one another they may exchange data items. It is envisioned that in such a scenario where there is no connectivity, data mules (e.g. vehicles or drones) can move around randomly. So these data mules act as kind of mobile routers, which can interact with end users, working base stations and other data mules to fetch and deliver the data and queries. Thus, the present invention does not consider ad hoc networks where paths to a destination can be built reactively or proactively, but a DTN or DTN like scenario, as described for instance in V. Cerf et al.: "Delay-Tolerant Networking Architecture", RFC 4838, April 2007.

FIG. 1 shows such an exemplary disaster scenario, where data mules R (rescue teams) may move around in and across different fragmented networks. For better understanding, consider a large scale disaster scenario like the earthquake in Japan in 2011, where people in different parts of the city are stranded without the internet connectivity. But there are some zones, where base stations are still working and providing connectivity.

With ICN, two different types of messages exist: a) interests for content (expressed via a name)—ICN interest messages or requests—, and b) the actual data items to match a given interest. Essentially, the scenario is such that ICN data mules move randomly across a geographic area and, when meeting/encountering end-users, they receive interests (for content) from them and also forward corresponding data items to end-users (if present in the content store/cache of the data mule). At the same time, when data mules encounter each other, they forward to each other certain end-user interests and/or data items (according to a predefined rule-set and algorithm), such that interests and data items can be forwarded in a hop-by-hop DTN fashion.

SUMMARY

In an embodiment, the present invention provides a method of processing information centric networking (ICN) interest messages in a delay tolerant networking (DTN) scenario, wherein ICN data mules receive interests for content from end-users and disseminate content to end-users based on the interests and/or during encounters with other ICN data mules. The method includes performing a popularity estimation of content; appending, by a first end-user when forwarding an interest for given content to a data mule, a nonce to the interest; and employing, by a first data mule, the appended nonce according to predefined rules to maintain and/or record a counter for interests for the given content. The counter functions as a popularity indicator for the given content.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
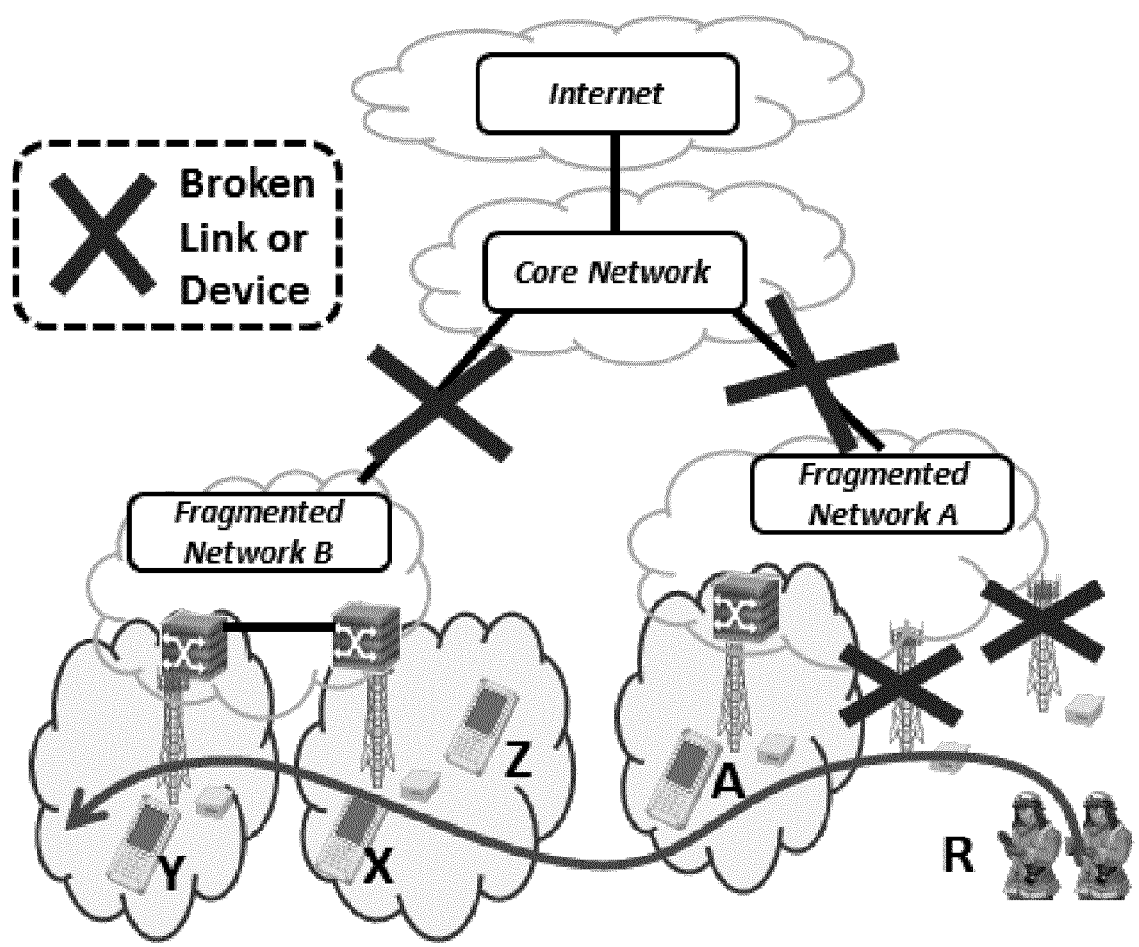
FIG. 1 is a schematic view of a typical ICN DTN data mule disaster scenario to which embodiments of the present invention apply.

One research problem is how to optimize data exchanges among data mules for optimal data dissemination, e.g. optimizing how many desired messages reach their recipients within a given timeframe with a given forwarding strategy, assuming that data mules only have limited time at each encounter to exchange messages.

An aspect of the present invention is to provide methods and devices in such a way that the popularity of interest messages among end-users can be accurately and reliably estimated in a scalable and completely decentralized manner among data mules in a DTN ICN scenario.

According to an embodiment, a method is characterized in that a popularity estimation of content is performed, wherein end-users, when forwarding an interest for a given content to a data mule, append a nonce to said interest, and wherein said data mules, by employing said nonces according to predefined rules, maintain and/or record a counter for the interests related to a given content, wherein said counter functions as popularity indicator for said content.

According to an embodiment, a device is characterized in that said device comprises a processing tool that is configured to extract nonces appended to interests communication means receive from end-users, and, by employing said nonces according to predefined rules, to maintain and/or to record a counter for the interests related to a given content, wherein said counter functions as popularity indicator for said content.

In order to optimize the exchange of messages at an ICN data mule encounter, it is very useful to estimate the overall popularity (among end-users) of a given ICN interest message, since it facilities maximization of receipt of the desired messages: If data mules can estimate which interests are "more important" than others, it is possible for data mules to optimize the exchange of messages at encounters with other data mules. In particular, due to popularity estimation a faster information spread of specific items end-users are interested in becomes possible. Methods described herein can enable distributed estimates (among data mules)—in a completely decentralized DTN-like scenario—of the popularity of interests (as issued by end-users), thereby achieving scalable, distributed counting/aggregating of interests (in the sense of a popularity count). Embodiments of the invention provide a scalable solution with loop detection that works in a fully decentralized scenario with random, unpredictable movements of ICN data mules.

Furthermore, embodiments of the present invention can be advantageous in that each node has to remember only a few nonces for the same name in the whole network. It is quite possible that data mules in the network have different nonce values and popularity counters for the same prefix at a given point in time. Still another advantage of the present invention can be the fact that this procedure only needs a minor change in the implementation of the end users.

For the method according to the invention being executed by data mules, these network nodes are equipped with communication means that are configured to receive interests for content from end-users and to disseminate content to end-users based on the interests and/or during encounters with other network nodes that also function as data mules. Furthermore, the network nodes are equipped with means for processing received interest messages, in particular for processing the nonces and/or counters appended to these messages according to predefined rules in order to record a counter for the interests related to a given content that can be employed as popularity indicator for this content.

According to an embodiment of the invention it may be provided that an end-user, when forwarding an interest for a given content to any of the data mules for the first time, appends a randomly generated unique nonce to said interest.

According to a further embodiment it may be provided that a data mule, when receiving an interest for a given content from an end-user, has a counter larger than 0 for the content, i.e. for the name of interest, already at that point in time, the data mule generates a new nonce, appends its current counter incremented by 1 to the nonce and assigns the new nonce together with the incremented counter to the end-user for the given name, preferably in form a [nonce: counter] tuple.

According to an embodiment it may be provided that an end-user that encounters a data mule after having previously been assigned for a given content a nonce together with a counter from another, previously encountered data mule, appends the previously assigned nonce and counter to an interest for the content instead of its own generated nonce. Specifically, if the end-user encounters a different data mule in the future, it uses the [nonce: counter] tuple it has been assigned.

According to another embodiment, a data mule, when encountering another data mule or an end-user, may determine an aggregated counter for the interests related to a given content depending on its own respective current nonce and counter and on the respective current nonce and counter of the encountered data mule or end-user. In this regard, different rules may be applied on handling/processing new nonces and counters, preferably in the form of [nonce: counter] tuples, which are appended to interests.

For instance, it may be provided that a data mule, when an interest for a given content from an end-user is the first interest the data mule receives for that content, adopts the nonce and the counter that are appended to the received interest for future use. Similarly, if a data mule receives a new end-user request, i.e. if it is the first data mule encountered by the end-user, the end-user will send an interested with a freshly generated nonce. The data mule accepts this, and if it has already received one or more different interests for that name (i.e. its counter is equal to or larger than 1), assigns a new [nonce:counter] tuple and sends it to the end-user for use from now on.

On the other hand, if the end-user has already been assigned a [nonce: counter] tuple (from a previously met data mule), when meeting a new data mule this may be send along with the interest. If this is the first interest the data mule receives for this name, it may store the [nonce:counter] tuple. If it has already a different [nonce:counter] tuple, but with the same nonce, from that point in time the [nonce: counter] tuple with the larger counter prevails and will be used by the end-user and data mule from thereon (as a lower bound on end user requests and this popularity of the interest). If the nonce is different, it may be provided that the data mule assigns its previous nonce, but with the counter being the sum of both previous counters, as will be explained in more detail below.

According to an embodiment it may be provided that a data mule, when it has stored the same nonce as the one appended to an interest for a given content received from an end-user, but a counter different from the one appended to the received interest, adopts the larger counter together with the respective nonce for future use.

According to a further embodiment it may be provided that a data mule, when it has stored a different nonce than the one appended to an interest for a given content received from an end-user, maintains its previous nonce and adopts as counter for future use the sum of its own previous counter and the end-user's counter as appended to the received interest.

According to embodiments of the invention it may be provided that data mules, when encountering each other, compare their stored nonces and counters. In case this comparison yields that the nonce and the counter for a given content are the same at two data mules that encounter each other, both data mules maintain their stored nonce and counter for the given content.

In case the nonce for a given content is the same at two data mules that encounter each other, while the respective counters are different, both data mules may adopt the larger counter as counter for future use and may adopt as nonce for future use the nonce pertaining to the larger counter. In this case the larger counter indicates kind of lower bound on end-user requests and this popularity of the interest.

In case the nonce for a given content is different at two data mules that encounter each other, it may be provided that both data mules adopt the sum of both counters as counter for future use and adopt as nonce for future use the nonce pertaining to the larger counter.

According to a preferred embodiment it may be provided that each time a data mule encounters another data mule and updates its nonce and counter for a given content during the encounter, the data mule adds an ID of the encountered data mule to a memory list of length k. Here, k may be a configuration parameter each data mule can set individually. This memory list may be used in the following way:

If a data mule is encountered and already on the memory list for a given name, the largest counter and the nonce with the originally largest counter are adopted for future use by both nodes. By applying this mechanism overestimation can reliably be prevented. If the memory list has been filled up to its maximum length k, from thereon only the largest counter and the nonce with originally largest counter are adopted by both nodes. Data mules apply this same scheme to detect re-visits of end-users that have changed the nonce due to intermediate encounters of other data mules.

According to an alternative embodiment, instead of using the rule "nonce with originally largest counter prevails at both nodes, largest counter prevails at both nodes", when the memory list of length k is full for a given name at a data mule encounter, a sliding window approach can be used for the memory list as follows: if the memory list is full, the first encounter in the list gets removed and all other entries get shifted in a sliding window kind of fashion, so that the newly encountered data mule can be added to the last position in the list. Then, the rule "nonce with originally largest counter prevails at both nodes with counter being sum of both previous counters" is being used. In other words, once the list is full newly encountered data mules get added in a FIFO (First In First Out) fashion where the oldest encountered node leaves the list, and adding of counters is applied at the risk of having encountered a node before but being off the memory list due to the sliding window. For this option, the length k of the memory list needs to be selected carefully such that loops of data mule encounters longer than k are highly unlikely; in this case, the mechanism provides a more accurate prediction than just applying the rule "nonce with originally largest counter prevails at both nodes, largest counter prevails at both node".

According to a preferred embodiment it may be provided that the content that is exchanged between two or more data mules at a data mule encounter is prioritized in accordance with the current counters these data mules have currently stored for the respective contents. Since the encounter time between two data mules could be small, such prioritized way of exchanging data during those short contacts can significantly increase the number of desired messages that are received by end-users. In a normal instance the interest to data exchange will work in First in First out (FIFO) manner, if a lot of pending interests have piled up. Specifically, a prioritized pending interest table may be employed which is configured to fetch the critical data (i.e. with highest priority counters) first from the corresponding data mule. So even if connectivity is lost, end-users get best out of the situation.

FIG. 1 shows an envisioned scenario and use case in which the present invention can be suitably applied. Connectivity to the backbone or the Internet is broken, but certain parts of a mobile network infrastructure, e.g. base stations, are functional, forming small fragmented sub-networks. User Y is in a different fragment than users X and Z. Rescue teams (R) (or any of the users X, Y, Z) may move across different network fragments, enabling to transport messages from one disconnected sub-network to another one in a DTN-like routing fashion.

It is noteworthy, however, that the invention is not only applicable to disaster scenarios: The invention at hand applies to any kind of decentralized ICN scenarios, where connectivity to central servers (which could be used for estimating interest popularity in a centralized fashion) is not available, for instance in case of certain IoT (Internet of Things) applications. In such a setting, moving ICN routers (which essentially constitute ICN data mules) can use the invention to estimate interest popularity and thus aggregate interest counters for optimized information spreading. Such settings may include flash crowds which often result in congestion towards central servers, or scenarios with partial coverage (e.g. not all nodes have connectivity to a backbone connection).

Further, it should be noted that with per-hop routing (as described, e.g. in S. Jain et al.: "Routing in a Delay Tolerant Network", in ACM SIGCOMM 2004 Conference on Applications, Technologies, Architectures, and Protocols for Computer Communication, Portland, Oreg., USA, Aug. 30-Sep. 3, 2004) and limited network resources in a Delay Tolerant Network, calculating popularity of content in a scalable manner can be a major challenge. Due to limited information of the topology of the network, this kind of routing might lead to loops in the network.

Concrete exchange algorithms for data mule encounters (e.g. traffic engineering/scheduling/prioritizing according to the popularity of interests in an opportunistic network) are outside of the present invention; embodiments of the invention solely tackle the problem of estimating the popularity of interest messages in a completely decentralized manner among data mules in a DTN ICN scenario. Thus, embodiments of the invention provide a scalable, distributed counting/aggregating of interests (in the sense of a popularity count) in an opportunistic network/DTN scenario where ICN interest messages and corresponding data items are being used. In particular, embodiments of the invention are related to a scalable solution with loop detection that works in a fully decentralized scenario with random, unpredictable movements of ICN data mules.

Embodiments of the invention provide a concrete mechanism to calculate/aggregate the popularity of interests for data (as issued by end-users) in a Delay Tolerant Network scenario using the key functionalities of Information Centric Networking (name based forwarding). Due to limited network resources in this network such as buffer space and bandwidth, popularity of content interests can help to make better caching and forwarding decisions during Data Mule to Date Mule (DM-DM) communication. The lack of continuous connectivity makes it difficult to detect duplicate end-user interests/requests, which can increase the network congestion/memory usage/lookup time.

A naïve solution to the aforementioned problem of decentralized popularity estimations of end user requests (with randomly moving data mules) would be to append to each end-user request a unique nonce (e.g. randomly created and appended by each end user for each interest for a given name). However, such a solution does not scale: if, for instance, a data mule has received 1000 interests for the same name, it would need to store 1000 nonces just for this name. Moreover, if two data mules meet that each has received 1000 interests so far, they would need to match/compare their 1000 nonces with each other.

One of the key ideas behind the present invention is the following: while end-users assign each interest a unique nonce (as in the naïve solution explained above), when they forward such a request to a data mule and the data mule has a counter larger than 0 for the name of the interest already at that point in time, the data mule generates a new nonce, appends its current counter incremented by 1 to the nonce, and assigns the [nonce:counter] tuple to the end-user for the given name. If the end-user encounters a different data mule in the future, it uses the [nonce:counter] tuple it has been assigned. Further, when two data mules encounter each other and both have for a given name already a [nonce:counter] tuple, aggregation of nonces and counters is performed, as detailed below. It should be noted that alternative ways of assigning and storing a nonce and a counter, i.e. different from a [nonce:counter] tuple, may be applied likewise, as will be easily appreciated by those skilled in the art.

A basic working principle of a popularity indicator or counter in accordance with embodiments of the invention is explained in connection with the diagrams of FIG. 2. Generally, the diagrams indicate situations in which communication devices, which function as ICN data mules in a DTN network, meet end-users and afterwards encounter each other.

Figure 2A:
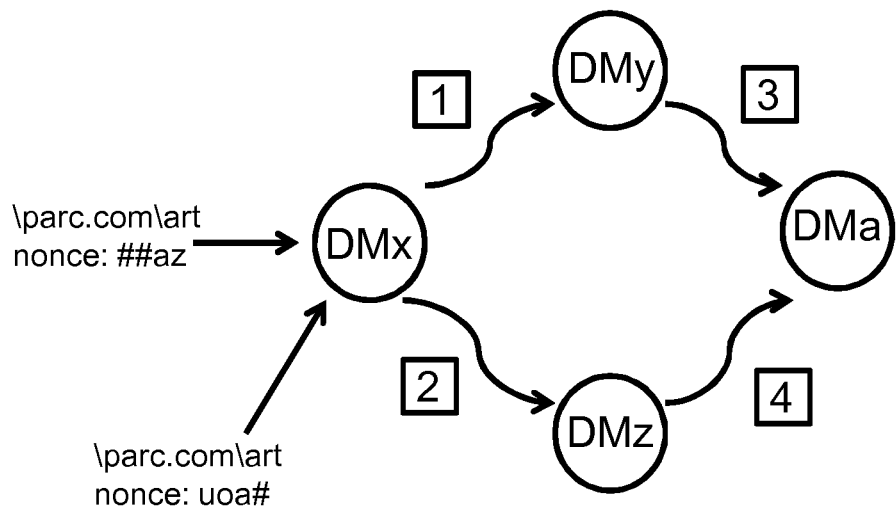
FIGS. 2a-2e are a schematic views illustrating a basic working principle of a popularity counter in various scenarios in accordance with embodiments of the present invention.

FIG. 2a illustrates a scenario with four data mules DMx, DMy, DMz, and DMa, which are assumed to move in a random and unpredictable fashion. The numbers given in the rectangular boxes indicate the chronological order in which data mules encounter each other, i.e. at first data mule DMx encounters data mule DMy and subsequently DMz, then DMy encounters DMa, which finally in encounters DMz.

Further, in FIG. 2a two end users request the same name from data mule DMx, i.e. they each send an interest for content (expressed via name, i.e. prefix, "\parc.comart") to DMx. In accordance with embodiments of the present invention the end-users append a unique nonce to their requests ("##az" and "uoa#", respectively)

Figure 2B:
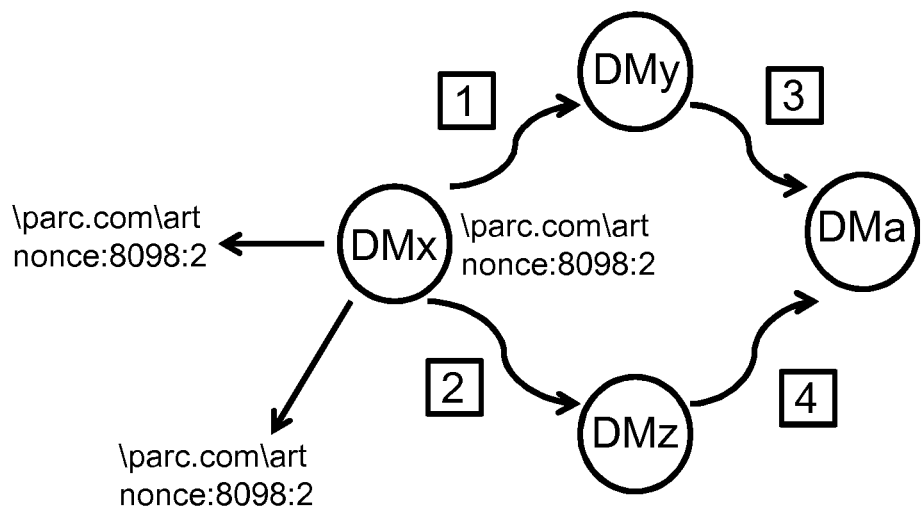

As illustrated in FIG. 2b, in reaction to receiving two interests for the same content, DMx assigns both requesting end-users a new nonce (which is 8098 in the illustrated embodiment) together with a count 2 for the respective prefix (or name, to use the common ICN notation). The assignment is performed by using tuples of the form [nonce:counter], although different representations are possible, as will be easily appreciated by those skilled in the art. It should be noted that DMx also stores the tuple [8098:2] for future use.

Figure 2C:
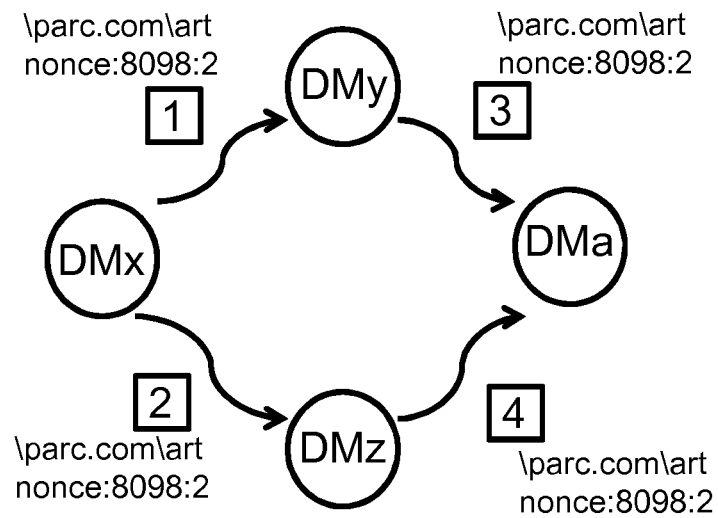

Turning now to FIG. 2c, during encounter of DMx with DMy (i.e. encounter denoted with 1 in FIG. 2) the tuple [8098:2] is adopted by DMy, during encounter of DMx with DMz (i.e. encounter denoted with 2 in FIG. 2) the tuple [8098:2] is also adopted by DMz, and during encounter of DMy with DMa (i.e. encounter denoted with 3 in FIG. 2) the tuple [8098:2] is also adopted by DMa. In this situation an encounter between DMa and DMz takes place (i.e. encounter denoted with 4 in FIG. 2). Since both the stored nonce and the stored counter are identical at DMa and DMz, nothing needs to be done, as both data mules have apparently the same aggregated counter value. In other words, since DMa receives the tuple [8098:2] from DMz in duplicate, DMa simply drops the message and, for the reason of a loop detection, does not increase the counter.

Figure 2D:
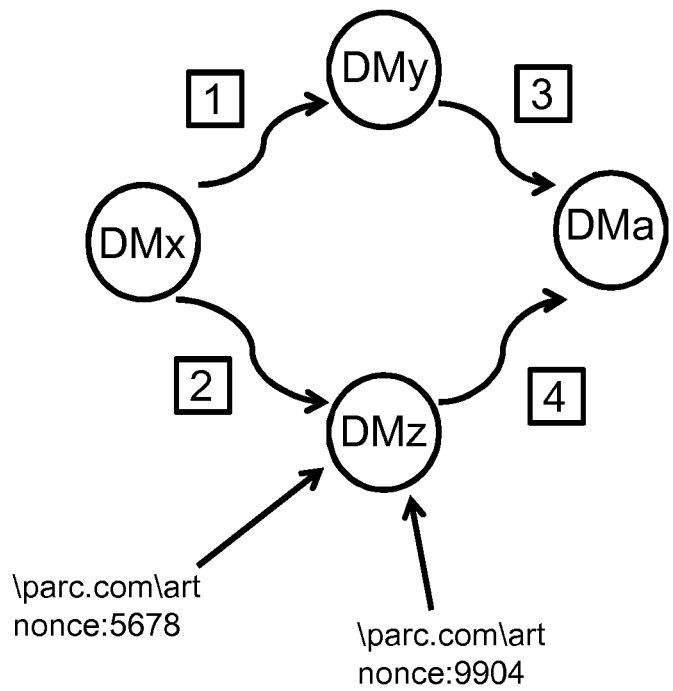
Figure 2E:
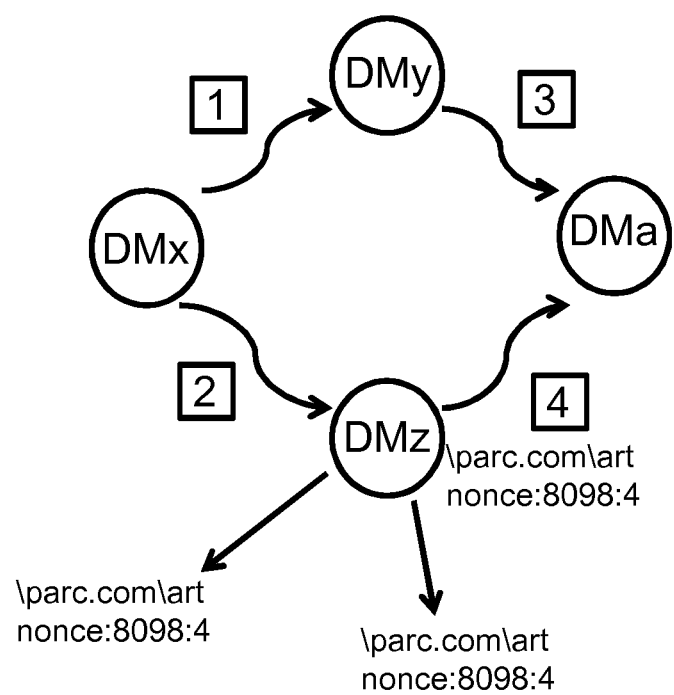

In the next scenario, illustrated in FIG. 2d, DMz receives two new end-user interest messages for the same content (again expressed by prefix "\parc.comart"), with the nonces 5678 and 9904, respectively, being appended to the interest messages. As illustrated in FIG. 2e, in reaction to receiving two interests for the same content, DMz updates its count to 4 (i.e. the sum of the previous count 2 and the two new interest messages) and assigns both requesting end-users its current nonce (i.e. 8098 in the illustrated embodiment) together with the new count 4 for the respective prefix.

Figure 3:
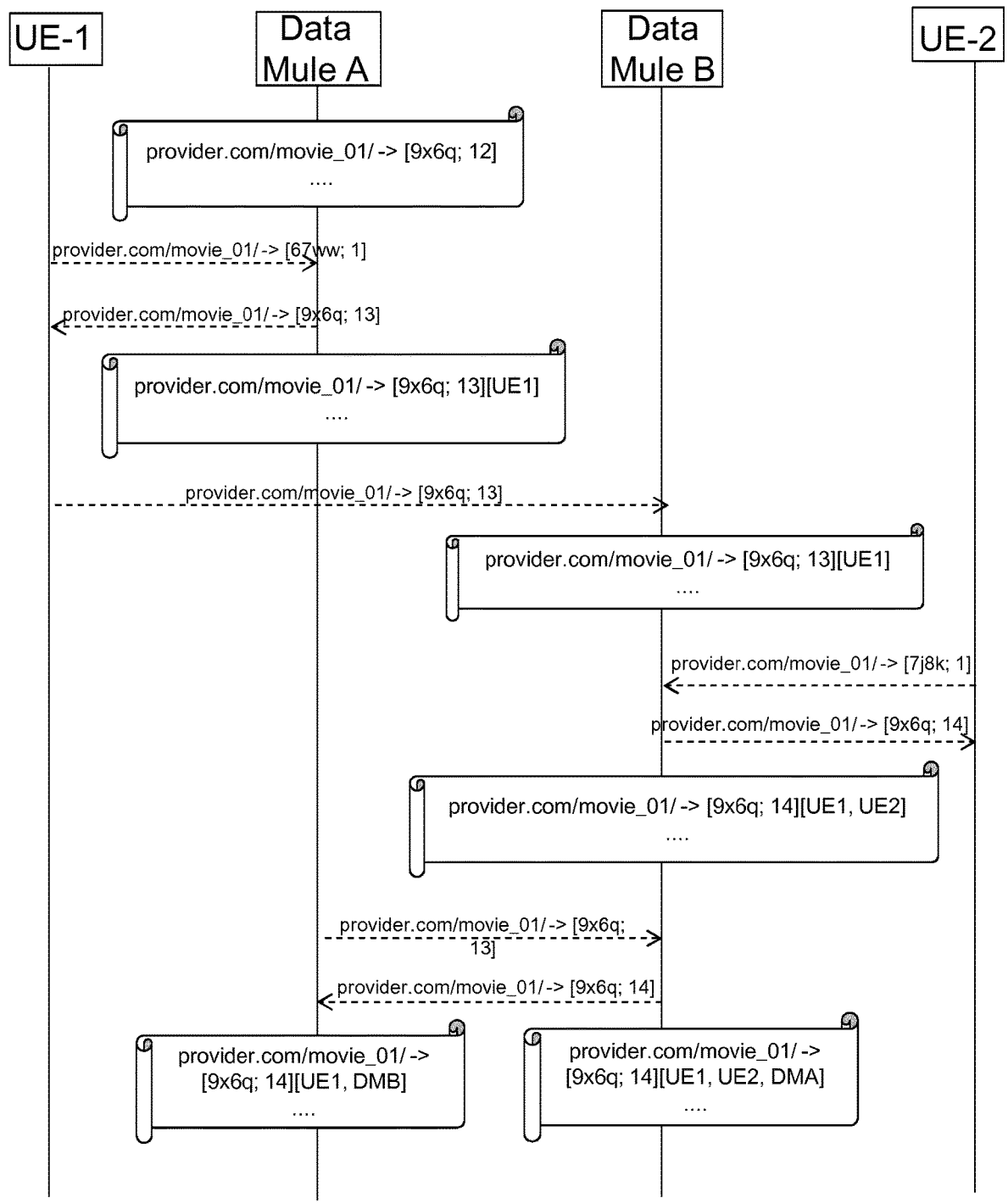
FIG. 3 is a message flow chart illustrating a data mule encounter scenario in accordance with an embodiment of the present invention.

FIG. 3 shows an example message flow in a data mule encounter scenario in accordance with an embodiment of the present invention where two data mules—DM-A and DM-B—each get a single, different interest from different UEs—UE-1 and UE-2, respectively. The notation [x; y] in FIG. 3 depicts a [nonce x, counter y] tuple for a given name. At the starting point of the depicted message flow it is assumed that data mule DM-A has already a counter of 12 for the given name "provider.com/movie_01/". UE-1 first encounters data mule DM-A, then data mule DM-B. Then, data mule DM-B encounters data mule DM-A.

The message flow shows how the data mules update their interest tables with aggregated nonce:counter tuples. First, when DM-A receives an interest for content related to prefix "provider.com/movie_01/" from UE-1, DM-A updates its counter (i.e. from 12 to 13) and assigns UE1 the tuple [9×6q:13] containing DM-A's current nonce together with DM-A's updated counter. Furthermore, DM-A stores a memory list, in which end-users and other data mules, which DM-A has encountered, are being recorded by storing the identifiers of the respective entities. In FIG. 3, after encounter with end-user UE-1, DM-A adds the respective identifier UE-1 to this memory list. Although in FIG. 3 the memory list is only shown for the data mules, it is to be understood that end-users could have such lists per name as well.

Next, according to the embodiment shown in FIG. 3, end-user UE-1, upon encountering DM-B, forwards an interest for the same content to DM-B, appending its current nonce:counter tuple [9×6q:13] to this interest message. Since this interest is assumed to be the first request DM-B receives for name "provider.com/movie_01/", DM-B just adopts the nonce:counter tuple [9×6q:13] and adds UE-1 to its memory list.

Then DM-B receives an interest request for the same content, i.e. name "provider.com/movie_01/", from end-user UE-2, with nonce:counter tuple [7j8k:1] being appended to the request. DM-B notes that the nonce appended to the request is different from its own current nonce and, thus, updates its counter from 13 to 14 and assigns UE-2 the tuple [9×6q:14] containing DM-B's current nonce together with DM-B's updated counter. Further, DM-B also adds UE-2 to its memory list.

Finally, there is an encounter between data mules DM-A and DM-B. Generally, when two data mules meet, three different cases may occur (for each given name these data mules have a pending interest for):

1) Same [noncexounter] tuple: If the [noncexounter] tuple is the same at both data mules, nothing needs to be done, as both data mules have apparently the same aggregated counter value.
2) Same nonces, but different counters: If the nonces are the same, but the counters are different, the counters cannot be added as—due to the random movement by data mules over time—it is not clear that both counters do not contain overlapping end-user requests. However, from that point in time both data mules can use the [noncexounter] tuple with the larger counter (as a lower bound on end user requests and this popularity of the interest). This behavior can be summarized as: Nonce with originally largest counter prevails at both nodes; largest counter prevails at both nodes.

3) Different nonces: If the nonces are different, the nonce with the largest counter prevails at both nodes. The counter can be added and both data mules use from thereon one nonce with a new counter being the sum of both previous counters. This behavior can be summarized as: Nonce with the originally largest counter prevails at both nodes, with counter being sum of both previous counters.

However, the following kinds of data mule encounter loops can occur (as an example, similar loops are imaginable): A data mule A meets first a data mule B, then meets data mule C, and then again data mule B. If in this case data mule C had a larger counter and a different nonce than A, A will add the counter of B twice, thereby overestimating the actual content popularity. To prevent such cases, each time a data mule encounters another data mule and updates its [noncexounter] tuple for a given name during the encounter, the data mule adds the ID of the encountered data mule to a memory list of length k (where k is a configuration parameter each data mule can set individually). If a data mule is encountered that is already on the list for a given name, the rule "only the nonce with the originally largest counter prevails at both data mules, and the largest counter prevails at both data mules" is being used in order to prevent overestimation. Also, if the list has been filled up to its maximum length k, the rule "only the nonce with originally largest counter prevails at both nodes; largest counter prevails at both nodes" is being used from thereon. Data mules may apply this same scheme to detect re-visits of end-users that have changed the nonce due to intermediate encounters of other data mules. Thus, the provision of a k-length memory list as described above allows for a flexible tradeoff between optimal popularity estimation and space requirements at end-nodes and/or data mules.

It should be noted that the above scheme is loop-free in the following sense: if there are loops in data mule encounters (as may very well be the case in a DTN scenario with random data mule movements), the counter for a given name does not overestimate interest popularity among end-users for that name. This is achieved by the memory list. The memory list can also be applied to end-user nodes to prevent over-counting at end-users when end-users with larger counters meet the same data mules over and over again (i.e. the end users have in the meantime each time been updated with a larger counter).

Turning back to the embodiment of FIG. 3, it can be noted that the second of the above cases (i.e. same nonces, but different counters) applies for the encounter of DM-A and DM-B. Consequently, both data mules maintained their nonce, but DM-A adopts the higher counter from DM-B for future use. Furthermore, both data mules update their memory lists by mutually adding their IDs.

The mechanism of aggregating interests, as described above in connection with FIGS. 2 and 3, can be implemented on any protocol which uses name based forwarding in a decentralized scenario, for instance on top of the popular CCN (Content-Centric Networking) protocol (as described, e.g., in Van Jacobson et al.: "Networking named content", in CoNEXT '09, Proceedings of the 5th international conference on Emerging networking experiments and technologies, Rome, Italy, p. 1-12). Exemplarily, in the flow diagram of FIG. 4 the internal working of the CCNx ICN Open-Source software daemon is shown for this particular mechanism. The modifications in the CCN Protocol necessary for an implementation in a DTN Scenario in accordance with embodiments of the present invention are shown within the dotted line box.

Figure 4:
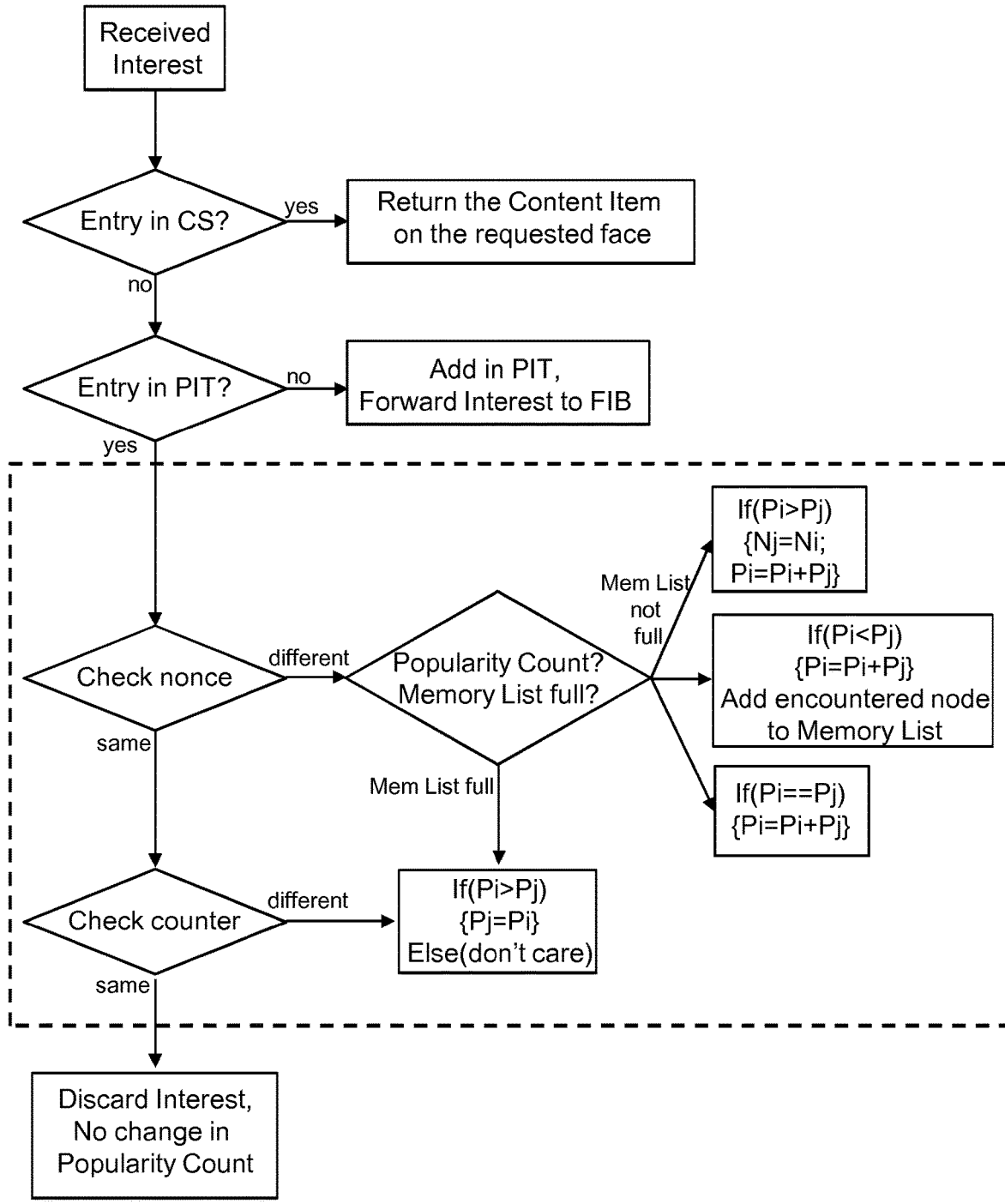
FIG. 4 is a flow diagram in accordance with an embodiment of the present invention when applied as CCNx Software Extension.

As shown in FIG. 4, according to the CCN specifications, if an Interest received at a network node is contained in the network node's CS (Content Store), the corresponding Content Item is returned on the requested face (i.e. interface to other CCNx routers, in CCNx terminology). If the Interest is not in the CS and is neither in the network node's PIT (Pending Interest Table), the Interest is added to the PIT and forwarded to the FIB (Forwarding Information Base).

However, if an Interest received at a network node is not in the CS, but in the PIT, a mechanism in accordance with an embodiment of the invention is triggered, as shown in FIG. 4 within the dotted line box. Specifically, it is checked whether the nonce and counter received in the interest differ from the local state. In case the nonce is different, the popularity counter is analyzed. If the network node's memory list is not yet full, the following scheme will be applied (wherein Px denotes the current popularity counter at node x, and Nx denotes the nonce at node x):

a) If the network node's counter Pi is larger than the counter Pj appended to the received interest, the counters Pi and Pj are added and the nonce Nj appended to the received interest is overwritten with the network node's nonce Ni (i.e. the nonce with the larger counter prevails).

b) If the network node's counter Pi is smaller than the counter Pj appended to the received interest, the counters Pi and Pj are added, and the network node adds the identity of the encountered node to its memory list.

c) If the counters Pi and Pj turned out to be the same, the counters Pi and Pj are added.

If the network node's memory list is already full at the point of the encounter, the following scheme will be applied:

a) If the network node's counter Pi is larger than the counter Pj appended to the received interest, the counter Pj appended to the received interest is overwritten with the network node's counter Pi (i.e. the larger counter prevails, indicating a lower bound of the popularity of the respective content).

b) In any other case, the nonces and counters are maintained without performing any changes.

The same (i.e. actions a) or b) as stated above) applies if the nonces Ni and Nj are identical.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method of processing information centric networking (ICN) interest messages in a delay tolerant network (DTN);
   wherein within the DTN, multiple data mules each comprising a processor and memory: (i) receive ICN interest messages requesting digital content from end-clients, each comprising a processor and memory, and/or from other of the data mules and (ii) disseminate digital content to the end-clients and/or the other data mules based on the received ICN interest messages;
   wherein the method comprises:
      storing in memory, with a first of the data mules, (i) a structured name identifying first content, (ii) a first nonce associated with the first content, and (iii) a first counter associated with the first content, the first counter indexing demand for the first content within the delay tolerant network;
      receiving, with the first data mule, a first ICN interest message during an encounter with a first of the end-clients, the first ICN interest message requesting access to the first content and comprising (i) the structured name identifying the first content and (ii) a second nonce associated with the first content;
      based on determining that the structured name within the first ICN interest message matches the stored structured name, comparing, with the first data mule, the first nonce with the second nonce; and
      with the first data mule and based on the comparison of the nonces, updating the first counter;
   wherein the first data mule compares a stored nonce and counter of its own with a stored nonce and counter of another data mule in the case of an encounter between the first data mule and the other data mule,
   wherein, when the nonce and the counter for given content stored by the first data mule is the same as the nonce and the counter for the given content stored by the other data mule, both data mules maintain their stored nonce and counter for the given content, and
   wherein when the nonce for the given content stored by the first data mule is the same as the nonce for the given content stored by the other data mule but the counter for the given content stored by the first data mule is different than the counter for the given content stored by the other data mule, both data mules adopt the larger of the counter for the given content stored by the first data mule and the counter for the given content stored by the other data mule as a counter for future use and adopt as a nonce for future use the nonce stored by the data mule storing the larger counter.

2. The method according to claim 1, wherein the first end-client, when forwarding the interest message for the first content to the first data mule for a first time, appends the randomly generated second nonce to the message.

3. The method according to claim 1, wherein the first counter is larger than 0 for the first content, and wherein when the first data mule receives the interest message for the first content from the first end-client, the first data mule generates a new nonce, increments the first counter by 1, and assigns the new nonce together with the incremented counter to the end-user for the first content as a [nonce:counter] tuple.

4. The method according to claim 1, wherein the first end-client encounters the first data mule after having previously been assigned for the first content, the second nonce together with a second counter from another, previously encountered data mule and appends the previously assigned second nonce and second counter to the interest message for the first content.

5. The method according to claim 1, wherein the first data mule, when encountering another data mule or another end-user, determines an aggregated counter for interests related to the first content depending on its own respective current nonce and counter and on a respective current nonce and counter of the encountered other data mule or other end-user.

6. The method according to claim 1, wherein the first data mule has stored a same nonce as the one appended to the received interest message for the first content received from the first end-user, such that the first and second nonces are equal, but a counter different from a counter appended to the received interest message, wherein the first data mule adopts a larger of the counter appended to the received interest message and the different counter together with the stored nonce for future use.

7. The method according to claim 1, wherein the first data mule has stored a different nonce than the one appended to the interest message for the first content received from the first end-client such that the first nonce and the second nonce are different, and wherein the first data mule maintains the stored first nonce and adopts as a counter for future use a sum of the first counter and a counter of the end-client as appended to the received interest message.

8. The method according to claim 1, wherein when the nonce for the given content stored by the first data mule is different than the nonce for the given content stored by the other data mule, both data mules adopt a sum of the counter stored by the first data mule and the counter stored by the other data mule as a counter for future use and adopt as a nonce for future use the nonce stored by the data mule storing the larger counter.

9. The method according to claim 1, wherein content that is exchanged between the first data mule and another data mule at a data mule encounter is prioritized in accordance with a current counter stored by the first data mule and a current counter stored by the other data mule for respective contents.

10. The method according to claim 1, wherein the first data mule is a first drone comprising a motor.

11. The method according to claim 1, wherein the first data mule is configured to locally cache content within the memory and the method further comprises updating the local cache to include the first content based on a size of the first counter.

12. The method according to claim 1, further comprising:
   based on determining that the first nonce and the second nonce are different, randomly generating, with the first data mule, a third nonce; and
   replacing, with the first data mule, the stored first nonce with the third nonce.

13. The method according to claim 12, further comprising:
   based on determining that the first nonce and the second nonce are different, instructing the first end-client to replace the second with the third nonce.

14. A method of processing information centric networking (ICN) interest messages in a delay tolerant network (DTN);
wherein within the DTN multiple data mules each comprising a processor and memory: (i) receive ICN interest messages requesting digital content from end-clients, each comprising a processor and memory, and/or from other of the data mules and (ii) disseminate digital content to the end-clients and/or the other data mules based on the received ICN interest messages;
wherein the method comprises:
storing in memory, with a first of the data mules, (i) a structured name identifying first content, (ii) a first nonce associated with the first content, and (iii) a first counter associated with the first content, the first counter indexing demand for the first content within the delay tolerant network;
receiving, with the first data mule, a first ICN interest message during an encounter with a first of the end-clients, the first ICN interest message requesting access to the first content and comprising (i) the structured name identifying the first content and (ii) a second nonce associated with the first content;
based on determining that the structured name within the first ICN interest message matches the stored structured name, comparing, with the first data mule, the first nonce with the second nonce; and
with the first data mule and based on the comparison of the nonces, updating the first counter;
wherein each time the first data mule encounters another data mule and updates its nonce and counter for the given content during the encounter, the first data mule adds an identifier of the encountered data mule to a memory list of length k, wherein k is a configuration parameter each data mule can set individually, and
wherein, when the memory list of length k is full for a given content at a data mule encounter, a first encounter in the memory list is removed, all other entries are shifted by one position towards a beginning of the memory list, and an identifier of the newly encountered data mule is added to a last position in the memory list.

15. A device for deployment as a first data mule in a delay tolerant network (DTN), the device comprising:
a processor coupled to a transceiver and a non-transitory storage medium or media containing (i) a structured name identifying first content, (ii) a first nonce associated with the first content, (iii) a first counter associated with the first content, the first counter indexing demand for the first content within the delay tolerant network, and (iv) instructions, which when executed by the processor, causes the device to perform a method comprising:
receiving a first ICN interest message during an encounter with a first end-client, the first ICN interest message requesting access to the first content and comprising (i) the structured name identifying the first content and (ii) a second nonce;
based on determining that the structured name within the first ICN interest message matches the stored structured name, comparing the first nonce with the second nonce; and
based on the comparison of the nonces, updating the first counter;
wherein the device is configured such that:
each time the device encounters another data mule and updates its nonce and counter for the given content during the encounter, the device adds an identifier of the encountered data mule to a memory list of length k, wherein k is a configuration parameter each data mule can set individually, and
when the memory list of length k is full for a given content at a data mule encounter, a first encounter in the memory list is removed, all other entries are shifted by one position towards a beginning of the memory list, and an identifier of the newly encountered data mule is added to a last position in the memory list.

16. A device for deployment as a first data mule in a delay tolerant network (DTN), the device comprising:
a processor coupled to a transceiver and a non-transitory storage medium or media containing (i) a structured name identifying first content, (ii) a first nonce associated with the first content, (iii) a first counter associated with the first content, the first counter indexing demand for the first content within the delay tolerant network, and (iv) instructions, which when executed by the processor, causes the device to perform a method comprising:
receiving a first ICN interest message during an encounter with a first end-client, the first ICN interest message requesting access to the first content and comprising (i) the structured name identifying the first content and (ii) a second nonce;
based on determining that the structured name within the first ICN interest message matches the stored structured name, comparing the first nonce with the second nonce; and
based on the comparison of the nonces, updating the first counter;
wherein the device is configured such that:
when the device compares a stored nonce and counter of its own with a stored nonce and counter of another data mule in the case of an encounter between the device and the other data mule,
when the nonce and the counter for given content stored by the device is the same as the nonce and the counter for the given content stored by the other data mule, both data mules maintain their stored nonce and counter for the given content, and
when the nonce for the given content stored by the device is the same as the nonce for the given content stored by the other data mule but the counter for the given content stored by the device is different than the counter for the given content stored by the other data mule, both data mules adopt the larger of the counter for the given content stored by the device and the counter for the given content stored by the other data mule as a counter for future use and adopt as a nonce for future use the nonce stored by the data mule storing the larger counter.

* * * * *